(12) United States Patent
Mauro, II

(10) Patent No.: US 7,200,386 B2
(45) Date of Patent: Apr. 3, 2007

(54) METHOD AND APPARATUS FOR PROVIDING CONFIGURABLE FUNCTIONALITY IN AN ELECTRONIC DEVICE

(75) Inventor: Anthony Patrick Mauro, II, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 509 days.

(21) Appl. No.: 10/029,565

(22) Filed: Dec. 19, 2001

(65) Prior Publication Data

US 2002/0103003 A1 Aug. 1, 2002

Related U.S. Application Data

(60) Provisional application No. 60/257,200, filed on Dec. 19, 2000.

(51) Int. Cl.
*H04Q 7/32* (2006.01)

(52) U.S. Cl. .............. 455/418; 455/419; 455/420; 455/412.1; 455/575.1; 455/552.1; 455/550.1

(58) Field of Classification Search ........ 455/403, 455/412.1, 412.2, 418, 419, 550.1, 563, 500, 455/517, 72, 575.1, 420, 414.1, 414.4, 422.1, 455/466, 552.1, 558, 90.3; 379/433.01, 433.09
See application file for complete search history.

(56) References Cited

U.S. PATENT DOCUMENTS

| | | | |
|---|---|---|---|
| 6,002,999 A * | 12/1999 | Han et al. ............... 704/201 |
| 6,108,562 A * | 8/2000 | Rydbeck et al. ........ 455/552.1 |
| 6,272,575 B1 * | 8/2001 | Rajchel .................. 710/301 |
| 6,463,274 B1 * | 10/2002 | Robertson ............... 455/406 |
| 6,529,730 B1 * | 3/2003 | Komaili et al. .......... 455/452.2 |
| 6,690,659 B1 * | 2/2004 | Ahmed et al. ........... 370/328 |
| 2002/0028670 A1 * | 3/2002 | Ohsuge ................. 455/413 |
| 2002/0065063 A1 * | 5/2002 | Uhlik et al. ............ 455/404 |
| 2002/0071396 A1 * | 6/2002 | Lee et al. .............. 370/252 |

* cited by examiner

*Primary Examiner*—Keith Ferguson
(74) *Attorney, Agent, or Firm*—Thomas R. Rouse; Sandip (Mickey) S. Minhas; Abdollah Katbab

(57) ABSTRACT

A method and apparatus for providing configurable functionality in a communication device. A memory stores a plurality of software modules, each module for performing a specific functionality for the communication device. A host processor receives a command to provide a desired communication type, and based on the communication type, selects one or more of the software modules and loads them into a digital signal processor. The digital signal processor then executes the one or more software modules to provide the desired communication type.

9 Claims, 3 Drawing Sheets

METHOD AND APPARATUS FOR PROVIDING CONFIGURABLE FUNCTIONALITY IN AN ELECTRONIC DEVICE

CROSS-REFERENCE TO RELATED APPLICATION

This application claims the benefit of U.S. Provisional Patent Application Ser. No. 60/257,200, filed Dec. 19, 2000, which is incorporated herein by reference in its entirety.

BACKGROUND

I. Field of the Invention

The present invention pertains generally to the field of microprocessor-based electronics, and more specifically to providing a method and apparatus for providing configurable functionality in such an electronic device.

II. Description of the Related Art

Wireless communications have become commonplace in much of the world today. In many digital wireless communication systems, audio information, typically voice, is transmitted between wireless communication devices and other end units via infrastructure equipment. Examples of various communication systems include code division multiple access (CDMA) systems, global system for mobile communications (GSM) systems, wideband code division multiple access (WCDMA) systems, as well as others.

Wireless communication devices used in such communication systems comprise many electronic circuits, organized into "functional blocks", for performing various functions necessary to the type of communications desired. Wireless communication devices are generally designed with a single type of functional block for each function to be performed. For example, in a wireless digital telephone, audio information is generally filtered and amplified, then converted into a digital signal using one of a possible number of functional blocks. The digital signal may then be provided to a vocoder, which is a well known device in the art for compressing digitized speech for efficient wireless transmission. The vocoder generates discreet packets of information, known as vocoder frames, and are then generally provided to a modulator. The vocoder circuitry, or functional block, is one of a number of different possible vocoder types that is designed into the wireless communication device by engineers who designed the wireless device.

Modulated data is then provided to an RF transmitter where the modulated data is upconverted and amplified prior to transmission. Various types of vocoders are widely known, for example, fixed or variable vocoders are readily available.

Of course, other wireless communication devices are designed specially for other tasks.

For example, another wireless communication device is a cellular telephone that communicates in an encrypted, or "secure", mode. In such a device, another functional block for providing encrypted communications is pre-selected by engineers and designed into the wireless communication device.

One problem with any of the above-described communication devices is that once the functional blocks for providing the desired functionality are chosen and incorporated into the wireless communication device, the overall functionality for the desired application is set and cannot be changed. For example, in an application where it is desired to send and receive secure voice communications using a variable-rate vocoder having a top encoding rate of 14 kbps, it is not possible to communicate using a vocoder having a top encoding rate of, say, 9 kbps, even if other communication devices are able to communicate using the 9 kbps encoding rate.

SUMMARY

The present invention is directed to a method and apparatus for providing configurable functionality in a wireless communication device. In one embodiment, a wireless communication device comprises a memory for storing a plurality of software modules, each of said plurality of software modules for providing a specific functionality for the wireless communication device. The wireless communication device also comprises a host processor for receiving a command to set up a communication, the command comprising information relating to the type of communication desired, and for selecting at least one of the plurality of software modules based on the type of communication desired, and further for loading at least one of the selected software modules into a digital signal processor. The digital signal processor stores the selected software modules and executes them as needed to provide the desired communication type.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Figure 1:
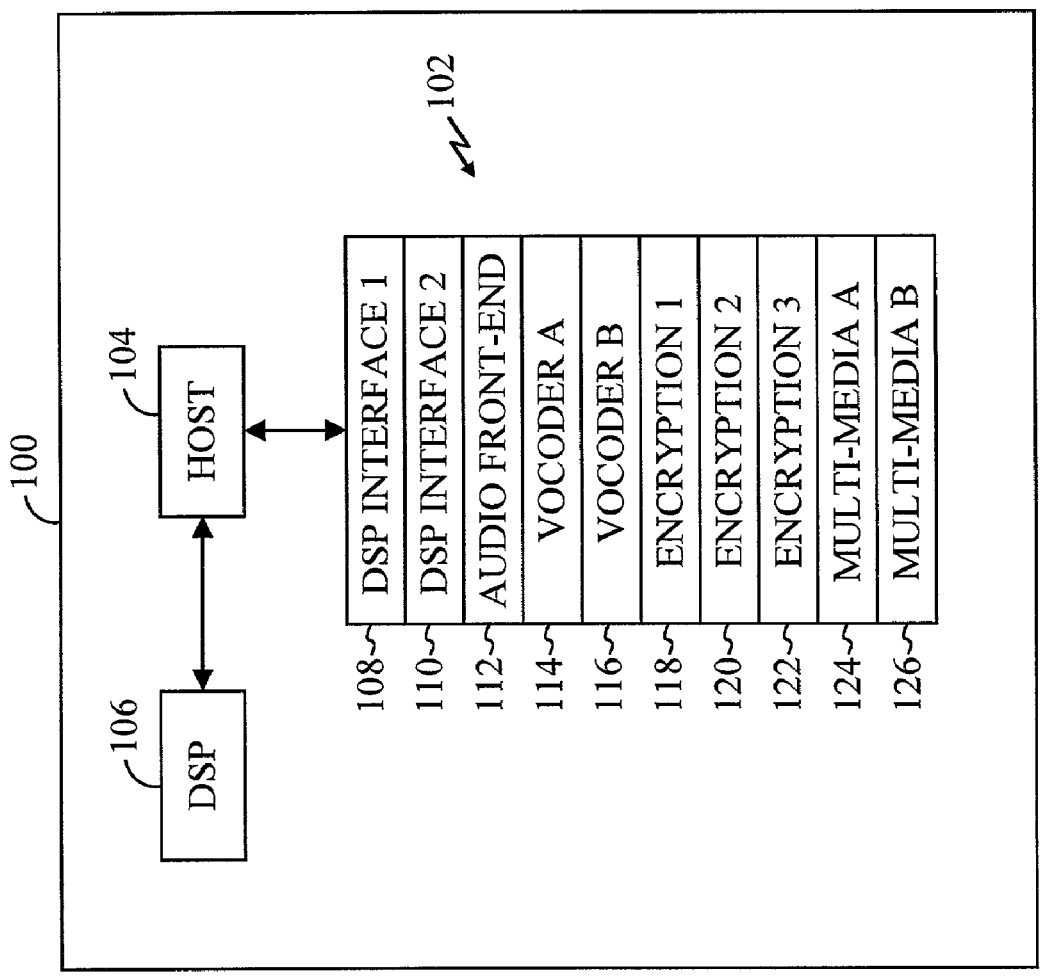
FIG. 1 illustrates a functional block diagram of a communication device employing the teachings of a method and apparatus for providing configurable functionality in a communication device.

FIG. 1 illustrates a functional block diagram of a communication device (CD) 100. As described herein, communication device 100 comprises a wireless telephone, although it should be understood that CD 100 could alternatively comprise one of any number of possible electronic devices, such as a wireline telephone, or a wireless or wireline data modem, among others. It should also be understood that CD 100 could comprise any electronic device, not just communication device, in which a digital signal processor (DSP) is used. Many function blocks of CD 100 have been omitted for clarity.

In one embodiment, CD 100 comprises a memory 102, a host processor 104, and a digital signal processor (DSP) 106. Memory 102 comprises an electronic digital memory for storing executable computer instructions, or software modules, for configuring CD 100 for multiple communication types. Memory 102 comprises a random access memory (RAM), a read-only memory (ROM), flash memory, electrically-erasable programmable read-only memory (EEPROM), ultra-violet programmable read-only memory (UVPROM), or any other electronic memory known in the art. Memory 102 could alternatively comprise an electro-mechanical storage device such as a hard drive, a tape drive, a CD rom, or others.

Memory 102 stores various software modules for performing functions relating to the operation of CD 100. As shown in FIG. 1, memory 102 comprises a first DSP interface module 108, a second DSP interface module 110, an audio front-end module 112, a first vocoder module 114, a second vocoder module 116, a first encryption cipher 118, a second encryption cipher 120, a third encryption cipher 122, a first multi-media module 124, and a second multi-media module 126. Each of these modules comprise executable computer instructions which can be run by DSP 106. It should be understood that a greater or a fewer number of software modules can be stored in memory 102 in other embodiments.

DSP 106 is a well-known digital signal processor for performing specialized tasks. The essential difference between a DSP and a microprocessor is that a DSP processor has features designed to support high-performance, repetitive, numerically intensive tasks. In contrast, general-purpose processors or micro controllers (GPPs/MCUs for short) are either not specialized for a specific kind of applications (in the case of general-purpose processors), or they are designed for control-oriented applications (in the case of micro controllers). Features that accelerate performance in DSP applications include:

- Single-cycle multiply-accumulate capability; high-performance DSPs often have two multipliers that enable two multiply-accumulate operations per instruction cycle; some DSP have four or more multipliers
- Specialized addressing modes, for example, pre- and post-modification of address pointers, circular addressing, and bit-reversed addressing
- Most DSPs provide various configurations of on-chip memory and peripherals tailored for DSP applications. DSPs generally feature multiple-access memory architectures that enable DSPs to complete several accesses to memory in a single instruction cycle
- Specialized execution control. Usually, DSP processors provide a loop instruction that allows tight loops to be repeated without spending any instruction cycles for updating and testing the loop counter or for jumping back to the top of the loop
- DSP processors are known for their irregular instruction sets, which generally allow several operations to be encoded in a single instruction. For example, a processor that uses 32-bit instructions may encode two additions, two multiplications, and four 16-bit data moves into a single instruction. In general, DSP processor instruction sets allow a data move to be performed in parallel with an arithmetic operation. GPPs/MCUs, in contrast, usually specify a single operation per instruction.

DSPs are commercially available from Texas Instruments, for example the TMS320C2000, TMS320C5000, and TMS320C6000 series of chips; Motorola (the DSP56300, DSP56800, and MSC8100 (StarCore) series); Agere Systems (formerly Lucent Technologies) (the DSP16000 series); and Analog Devices (the ADSP-2100 and ADSP-21000 ("SHARC") series).

Host processor 104 comprises generally any one of a number of microprocessors known in the art, such as any of the 80×86 processors manufactured by Intel Corporation. Alternatively, host processor 104 comprises an ARM 7 or an ARM 9, manufactured by Advanced RISC Machines, LTD.

Host processor 104 controls the overall functionality of CD 100, including the control of DSP 106 and memory 102. For example, in an embodiment where CD 100 comprises a wireless telephone, a user of CD 100 may initiate a wireless communication, for example, a "secure" voice communication with a second CD. The desire to initiate a secure voice communication may be explicitly entered by the user, for instance by depressing a predefined key on a keypad, or it may be a default configuration of CD 100. In another embodiment, the user may select a number of options relating to the type of communication desired. For example, the user may choose to initiate a voice communication, an asynchronous voice-over-data communication, a synchronous voice-over-data communication, a synchronous or asynchronous data communication, or other types of communications well known to those in the art. The user may also have other choices available to him or her as well, to customize the type of communication desired. For example, the user may choose which kind of vocoder to use during the communication, or which type of encryption/decryption cipher to use during a secure communication. The user may choose to initiate a multi-media communication in which one of several possible choices of media playback, encryption/decryption are possible.

In another embodiment, the user may not have explicit control over which features are used during a communication. In this embodiment, the decision on which software module in memory 102 to use is decided by host processor 104, either unilaterally, or during a negotiation period upon call setup with another CD. For example, in a unilateral arrangement, the user may have only a limited amount of control over the configuration of a desired communication. For example, the user may only be able to enter a desired communication mode, that is, either voice or data mode. When this command is received by host processor 104, host processor 104 determines which software modules should be used for the desired communication type. This may be based on a number of factors, including whether CD 100 is within range of a wireless service provider capable of providing the desired communication type.

Host processor 104 may, alternatively, decide which software modules to use during a call setup with another CD. During many wireless communications, information is exchanged between CDs prior to actual voice or data being transmitted during this time. Therefore, in the present example, if a user of CD 100 initiates a secure voice communication with a second CD, CD 100 will contact the second CD and negotiate an exchange of cryptographic keys or agree upon which cipher algorithm to use during the communication. It may be the case that memory 102 inside CD 100 comprises three cipher algorithms, A, B, and C and that the second CD comprises cipher algorithms C and D. Therefore, the only cipher algorithm that is common to both CDs is cipher algorithm C, and CD 100 would then select cipher algorithm C and load it into DSP 106 for use during the subsequent secure voice communication. Of course, other software modules could be negotiated as well, such as which vocoder to use during the communication. Again, once an agreed-upon vocoder is chosen, CD 100 selects and loads the chosen vocoder into DSP 106 for use during the communication.

DSP 106 comprises one or more electronic memories for receiving the selected software modules from host processor 104. Once stored in memory, the selected software modules are used to process information for transmission. For instance, voice information from a user is converted into vocoder frames using the selected vocoder software module.

If encrypted communications are desired, the vocoder frames might be encoded by an encryption software module. The encrypted data would then be passed to a modulator and RF circuitry for wireless transmission to the second CD.

FIG. 1 shows a number of software modules stored in memory 102. It should be understood that the software modules shown in FIG. 1 are for illustrative purposes only and, as such, a greater or fewer number and types of software modules could be present in other embodiments. Each of the software modules are designed and configured with generic Application Program Interfaces (API's) such that any module may be combined with another module and executed properly once selected and loaded into DSP 106.

DSP interface module 108 and DSP interface module 110 comprise executable computer instructions detailing how data is passed between, for example, host processor and DSP processor 106. For example, DSP interface module 108 may define a time interval for fetching vocoder frames from DSP 106 while DSP interface module 110 may define a series of interrupts which determine how data flows between DSP 106 and host processor 104.

Audio front-end module 112 might define the characteristics of certain filter and amplifier characteristics for "front-end" circuitry generally used to pre-process audio signals. It may also include various characteristics for controlling an analog-to-digital conversion process, such as the number of bits of resolution or speed at which a sample-and-hold process is carried out. Since only one such audio front-end module is shown in FIG. 1, it will be used every time there is a need by host processor 104 to use an audio front-end software module. Of course, a second audio front-end software module could be entered into CD 100 and stored in memory 102, using any number of conventional techniques well known in the art. In that case, host processor 104 would have to decide which of the two audio front-end software modules to use if the desired communication type necessitated the use of such a module. This would be done either unilaterally, or by some other method, as described earlier with respect to encryption software modules.

Vocoder module 114 and vocoder module 116 comprise executable computer instructions detailing how digitized audio information is encoded to minimize over-the-air transmissions.

Vocoders are well-known in the art for "compressing" human speech for more efficient wireless transmission. Vocoders may encode information at a fixed rate, or variable-rate vocoders may be used. Operational variations may exist between different fixed-rate vocoders and also between variable-rate vocoders. For example, vocoder module 114 may allow DSP 106 to encode information at 13 kbps at the highest data rate, while vocoder module 116 might allow DSP 106 to encode information at only 9.4 kbps at the highest data rate. Of course, other differences between vocoder modules could exist. Host processor 104 selects which of the available vocoders are used during a desired voice communication generally either unilaterally, or by negotiating with a second CD.

Encryption modules 118, 120, and 122 comprise executable computer instructions detailing how information is encrypted during secure communications. For example, encryption module 118 might comprise instructions to implement single DES (Data Encryption Standard), encryption module 120 might comprise instructions to implement triple DES, and encryption module 122 might be comprise instructions to implement RSA (Rivest, Shamir, and Adleman). Again, host processor selects one of the available encryption modules either by instructions from the user, unilaterally (for instance, always use DES, otherwise do not initiate secure communications), or by negotiation. Of course, each encryption module may also comprise instructions on how to decrypt information received by CD 100, or such instructions may be stored in memory 102 as individual modules.

Figure 2:
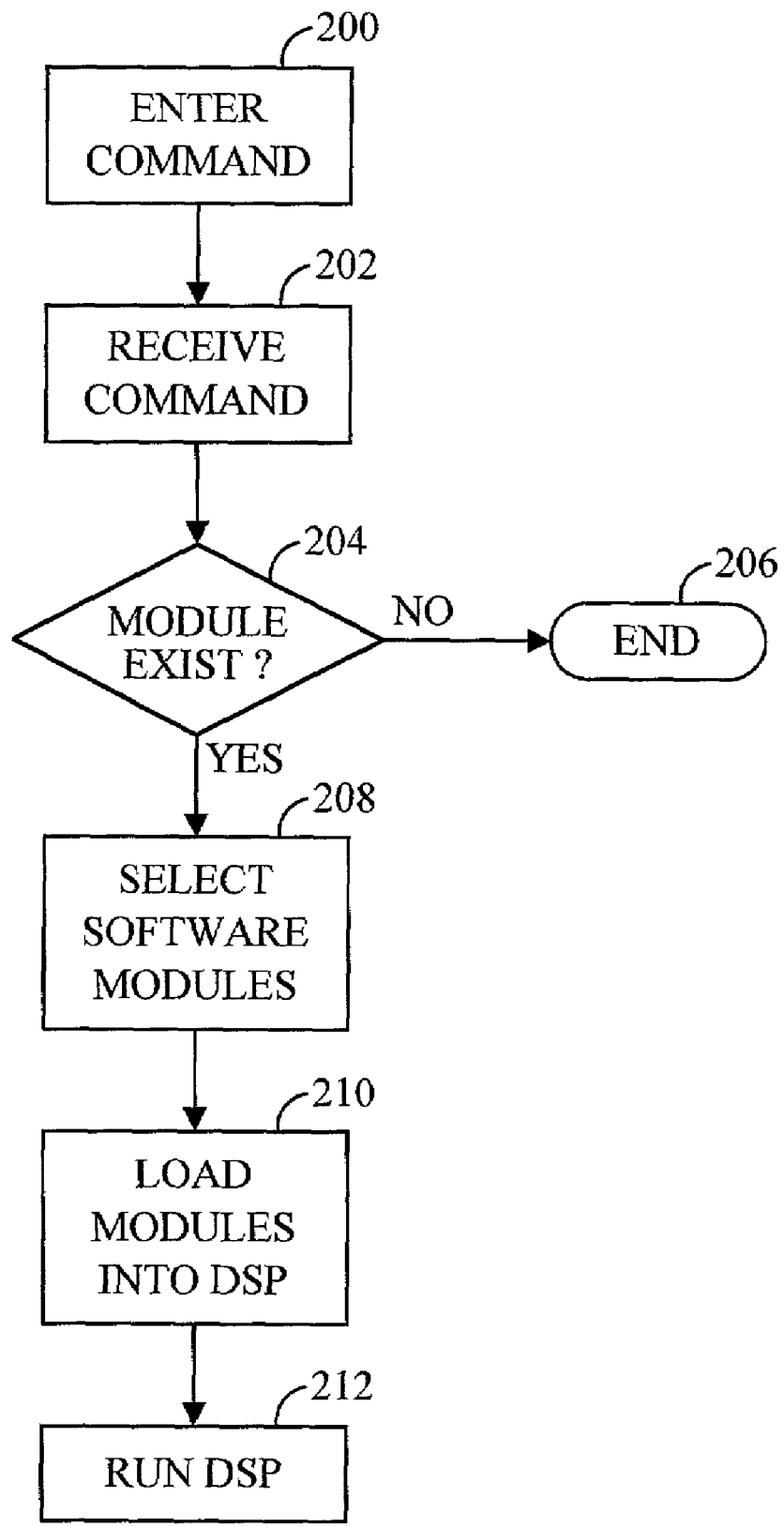
FIG. 2 illustrates a flow diagram illustrating one embodiment of the method for providing configurable functionality to a communication device.

Multi-media module 124 and 126 comprise executable computer instructions detailing how information is encoded and/or decoded with respect to audio and video compression schemes. Video information may be encoded using any number of compression schemes, such as MPEG, AVI, MPEG-2, and many others. Audio information may be encoded using any number of audio compression schemes, such as MP3, WAV, and others. If host processor 104 determines that a communication (or simply the storage or retrieval of audio and/or video information) is desired by the user of CD 100, host processor 104 selects one of the available multi-media modules and loads it into DSP 106. When media is received by host processor 104, it is provided to DSP 106 where the chosen multi-media module operates on it to either encode or decode the media, depending on the desired application FIG. 2 illustrates a flow diagram illustrating one embodiment of the method for providing configurable functionality to a communication device. In step 200, a user of CD 100 enters a command indicating a desire to initiate a communication. This is typically done by the user depressing one or more pre-designated keys on a keypad on CD 100.

In step 202, the command is received by host processor 104. The command comprises at least an indication of the type of communications desired, for example, voice communications, secure voice communications, asynchronous data communications, synchronous data communications, secure asynchronous data communications, secure synchronous data communications, voice-over-data communications, secure voice-over data communications, and others.

In step 204, host processor 204 determines whether or not at least one type of all software modules needed to perform the desired communication exist in memory 102. If one of the needed modules are missing, processing continues to step 206 where the process is terminated. An indication of such termination is generally conveyed to the user, generally in the form of an audible, visual, or tactile alert. In another embodiment, host processor 104 initiates an action to obtain the necessary software module(s), generally be initiating an over-the-air request for the needed module(s). The wireless request and subsequent receipt of data in a wireless communication system is well known in the art and will not be discussed herein.

If at least one type of each software module needed to perform the desired communication is present in memory 102, processing continues to step 208 where host processor 104 selects the software modules for the desired communication. As explained previously, if more than one software module exists for a particular function, host processor 104 selects one type of software module to use either unilaterally or by negotiating with a second CD, as explained above and as explained with respect to FIG. 3, below. In another embodiment, the user may also provide instructions to host processor 104 as to a preferred software module to be used.

Once host processor 104 has selected each software module for use in the desired communication, they are loaded into a memory contained within DSP 106, as shown in step 210.

In step 212, the software modules are executed by DSP 106 under the command of host processor 104, thereby providing the desired communication to the user.

Figure 3:
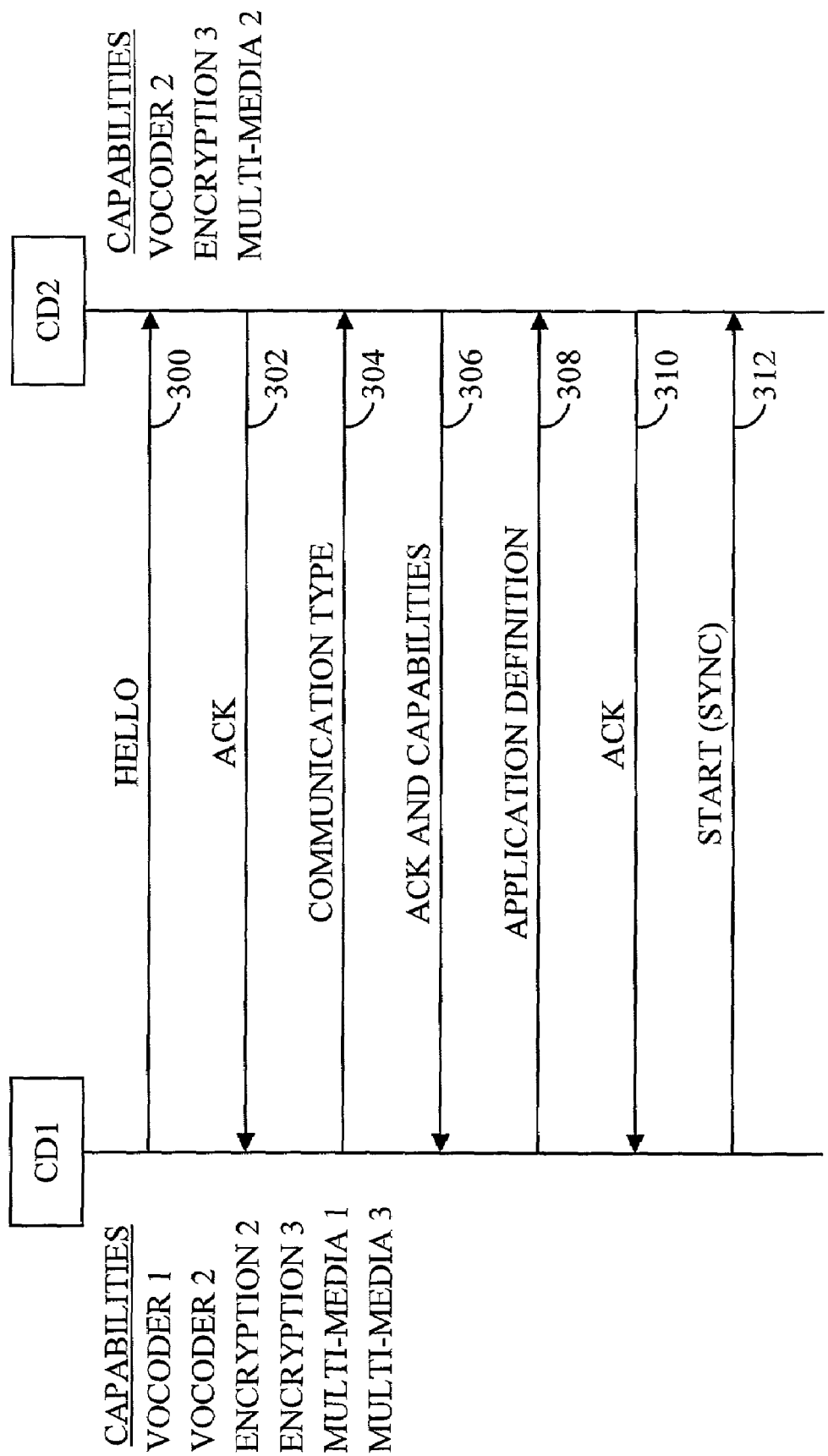
FIG. 3 is a diagram illustrating the various messages which are transmitted between a first communication device and a second communication device during negotiation during a call setup.

FIG. 3 is a diagram illustrating the various messages which are transmitted between a first CD (CD1 in FIG. 3) and a second CD (CD2 in FIG. 3) as software modules are negotiated during a call setup. CD1 comprises the following software modules in its memory 102: vocoder module 1, vocoder module 2, encryption module 2, encryption module 3, multi-media module 1, and multi-media module 3. CD2 comprises the following software modules in its memory 102: vocoder module 2, encryption module 3, and multi-media module 2. It is assumed that only modules having the same functionality can be used with each other, for example, vocoder module 1 can only be used to communicate with another CD having a similar vocoder module 1 functionality.

The first step in initiating a communication from CD1 to CD2 (after a desired communication type has been selected by a user of CD1) is for CD1 to send a "hello" message to CD2. The hello message is generally a message used to initiate a communication with another CD. The hello message may be transmitted directly to CD2 or it may be processed by in intermediary hardware, such as a cellular base station, Public Switched Telephone Network (PSTN), etc. In any case, the hello message simply alerts CD2 to the fact that CD1 wishes to initiate a communication.

In response to the hello message 300, CD2 transmits an acknowledgment (ACK) message 302, indicating to CD1 that CD2 has received the hello message and is ready to continue setting up the communication.

When the ACK 302 is received by CD1, a message 304 is transmitted to CD2 indicating the type of communications desired by CD1. The message 304 may explicitly indicate which communication type is desired (i.e., voice, secure voice, multi-media, data, etc), or the message 304 may simply comprise a list of one or more software module names which are desired for the communication to take place.

CD2 receives message 304 and in response transmits an acknowledgement (ACK) and capabilities message 306, in one embodiment. The ACK and capabilities message indicates to CD1 that CD2 received the message 304 and also provides a list of software modules available for use by CD2. The list of available modules may include all software modules stored in CD2's memory 102, or it may comprise a list of only those software modules pertinent to the type of communications requested by CD1. In another embodiment, CD2 does not use a series of software modules to configure itself for various communication types. In other words, CD1 may comprise a voice-only cellular telephone having a single vocoder to support such voice communications. In this case, CD2 would indicate the type of vocoder used in the ACK and capabilities message 306. CD1 would then be able to determine if communications are possible with CD2 based on the identification of the type of vocoder used in CD1.

CD1 receives the ACK and capabilities message 306 and determines which software modules to select for providing the requested communication type. In this example, if encrypted voice communications were requested, the host processor 104 within CD1 determines that CD2 is capable of running vocoder module 2 and encryption module 3 (or, for example, that CD2 comprises a single vocoder of a particular type which matches the functionality of one of the vocoder modules stored in memory 102). Since these two modules are the only ones that CD2 is capable of performing, the host processor 104 inside CD1 selects vocoder module 2 and encryption module 3 and loads those modules into DSP 106 to support the secure voice communication. Had CD2 not contained a matching vocoder module or encryption module to the modules stored within CD1, then host processor 104 inside CD1 could not complete the communication, and the user of CD1 would have been alerted accordingly.

After CD1 has selected the software module(s) to support the communication, an application definition message 308 is transmitted to CD2, indicating which software modules to use during the subsequent communication. CD2 then uses the identified software modules during the subsequent communication. If CD2 does not comprise the capability for adaptive configuration like CD1, but is able to nonetheless operate in accordance with the software module(s) as specified in the application definition message 308, then CD2 is able to continue with the communication setup.

When CD2 is ready to begin communications, it sends an acknowledgement message 310 to CD1 indicating that the application definition message 308 was received and that CD2 is ready for communicating using the software module(s) or equivalent functionality as indicated by CD1.

In response to the acknowledgement message 310, CD1 may, in one embodiment, transmit a start or sync message 312 to CD2 as an indication that the communication is starting. Such a start or sync message 312 may be used to synchronize one or more counters, variables, or other parameters between CD1 and CD2.

The previous description of the preferred embodiments is provided to enable any person skilled in the art to make and use the present invention. The various modifications to these embodiments will be readily apparent to those skilled in the art, and the generic principles defined herein may be applied to other embodiments without the use of the inventive faculty.

Thus, the present invention is not intended to be limited to the embodiments discussed herein, but is to be accorded the widest scope consistent with the principles and novel features disclosed herein.

I claim:

1. An apparatus for providing configurable functionality to a communication device, comprising:
   a memory for storing a plurality of software modules, each of said plurality of software modules for providing a specific functionality for said communication device;
   a host processor for receiving a command to set up a communication, said command comprising information relating to a type of communication desired, for selecting at least one of said plurality of software modules based on the type of communication desired, and for loading said at least one of said plurality of software modules into a digital signal processor, wherein said software modules are selected from the group comprising of a first multi-media module, a second multi-media module, a first cipher algorithm, a second cipher algorithm, a first audio front-end module, a second front-end module, a first DSP interface, a second DSP interface, a first secure communication module, a second secure communication module, a first synchronous communication module, a second synchronous communication module, a first asynchronous communication module, a second asynchronous communication module, a voice communication module; and a data communication module; and
   said digital signal processor for storing said at least one of said plurality of software modules and for executing said at least one of said plurality of software modules to provide said desired communication type.

2. A method for providing configurable functionality to a communication device, comprising:

storing a plurality of software modules, each of said plurality of software modules for providing a specific functionality for said communication device;

receiving a command to set up a communication, said command comprising information relating to a desired type of communication;

selecting at least one of said plurality of software modules based on the desired type of communication, wherein said software modules are selected from the group comprising of a first multi-media module, a second multi-media module, a first cipher algorithm, a second cipher algorithm, a first audio front-end module, a second front-end module, a first DSP interface, a second DSP interface, a first secure communication module, a second secure communication module, a first synchronous communication module, a second synchronous communication module, a first asynchronous communication module, a second asynchronous communication module, a voice communication module; and a data communication module;

loading said at least one of said plurality of software modules into a digital signal processor; and executing said at least one of said plurality of software modules to provide said desired communication type.

3. An apparatus for providing configurable functionality to a communication device, comprising:

means for storing a plurality of software modules, each of said plurality of software modules for providing a specific functionality for said communication device;

means for receiving a command to set up a communication, said command comprising information relating to a desired type of communication;

means for selecting at least one of said plurality of software modules based on the desired type of communication, wherein said software modules are selected from the group comprising of a first multi-media module, a second multi-media module, a first cipher algorithm, a second cipher algorithm, a first audio front-end module, a second front-end module, a first DSP interface, a second DSP interface, a first secure communication module, a second secure communication module, a first synchronous communication module, a second synchronous communication module, a first asynchronous communication module, a second asynchronous communication module, a voice communication module; and a data communication module;

means for loading said at least one of said plurality of software modules into a digital signal processor; and means for executing said at least one of said plurality of software modules to provide said desired communication type.

4. An apparatus for providing configurable functionality to a communication device, comprising:

a memory for storing a plurality of software modules, each of said plurality of software modules for providing a specific functionality for said communication device;

a host processor for receiving a command to set tip a communication, said command comprising information relating to a desired type of communication, for selecting at least one of said plurality of software modules based on the desired type of communication, and for loading said at least one of said plurality of software modules into a digital signal processor, said desired type of communication being one of a multi-media communication, wherein said software modules are selected from the coup comprising of a first multi-media module, a second multi-media module, a first cipher algorithm a second cipher algorithm, a first audio front-end module, a second front-end module, a first DSP interface, a second DSP interface, a first secure communication module, a second secure communication module, a first synchronous communication module, a second synchronous communication module, a first asynchronous communication module, a second asynchronous communication module, a voice communication module; and a data communication module; and said digital signal processor for storing said at least one of said plurality of software modules and for executing said at least one of said plurality of software modules to provide said desired communication type.

5. A method for providing configurable functionality to a communication device, comprising:

storing a plurality of software modules, each of said plurality of software modules for providing a specific functionality for said communication device;

receiving a command to set up a communication, said command comprising information relating to a desired type of communication;

selecting at least one of said plurality of software modules based on the desired type of communication, wherein said software modules are selected from the group comprising of a first multi-media module, a second multi-media module, a first cipher algorithm, a second cipher algorithm, a first audio front-end module, a second front-end module, a first DSP interface, a second DSP interface, a first secure communication module, a second secure communication module, a first synchronous communication module, a second synchronous communication module, a first asynchronous communication module, a second asynchronous communication module, a voice communication module; and a data communication module;

loading said at least one of said plurality of software modules into a digital signal processor, said desired type of communication being one of a multimedia communication; and executing said at least one of said plurality of software modules to provide said desired communication type.

6. An apparatus for providing configurable functionality to a communication device, comprising:

means for storing a plurality of software modules, each of said plurality of software modules for providing a specific functionality for said communication device:

means for receiving a command to set up a communication, said command comprising information relating to a desired type of communication;

means for selecting at least one of said plurality of software mod tiles based on the desired type of communication, wherein said software modules are selected from the group comprising of a first multi-media module, a second multi-media module, a first cipher algorithm, a second cipher algorithm, a first audio front-end module, a second front-end module, a first DSP interface, a second DSP interface, a first secure communication module, a second secure communication module, a first synchronous communication module, a second synchronous communication module, a first asynchronous communication module, a second asynchronous communication module, a voice communication module; and a data communication module;

means for loading said at least one of said plurality of software modules into a digital signal processor, said desired type of communication being one of a multi-media communication; and means for executing said at least one of said plurality of software modules to provide said desired communication type.

7. An apparatus for providing configurable functionality to a communication device, comprising:

a memory for storing a plurality of software modules, each of said plurality of software modules for providing a specific functionality for said communication device;

a host processor for receiving a command to set up a communication, said command comprising information relating to a desired type of communication, for selecting at least one of said plurality of software modules based on the desired type of communication, and for loading said at least one of said plurality of software modules into a digital signal processor, said desired type of communication being one of a clear communication and a secure communication, wherein said software modules are selected from the group comprising of a first multi-media module, a second multi-media module, a first cipher algorithm, a second cipher algorithm, a first audio front-end module, a second front-end module, a first DSP interface, a second DSP interface, a first secure communication module, a second secure communication module, a first synchronous communication module, a second synchronous communication module, a first asynchronous communication module, a second asynchronous communication module, a voice communication module; and a data communication module; and said digital signal processor for storing said at least one of said plurality of software modules and for executing said at least one of said plurality of software modules to provide said desired communication type.

8. A method for providing configurable functionality to a communication device, comprising:

storing a plurality of software modules, each of said plurality of software modules for providing a specific functionality for said communication device;

receiving a command to set up a communication, said command comprising information relating to a desired type of communication;

selecting at least one of said plurality of software modules based on the desired type of communication, wherein said software modules are selected from the group comprising of a first multi-media module, a second multi-media module, a first cipher algorithm, a second cipher algorithm, a first audio front-end module, a second front-end module, a first DSP interface, a second DSP interface, a first secure communication module, a second secure communication module, a first synchronous communication module, a second synchronous communication module, a first asynchronous communication module, a second asynchronous communication module, a voice communication module; and a data communication module;

loading said at least one of said plurality of software modules into a digital signal processor, said desired type of communication being one of a clear communication and a secure communication; and executing said at least one of said plurality of software modules to provide said desired communication type.

9. An apparatus for providing configurable functionality to a communication device, comprising:

means for storing a plurality of software modules, each of said plurality of software modules for providing a specific functionality for said communication device;

means for receiving a command to set up a communication, said command comprising information relating to a desired type of communication;

means for selecting at least one of said plurality of software modules based on the desired type of communication, wherein said software modules are selected from the group comprising of a first multi-media module, a second multi-media module, a first cipher algorithm, a second cipher algorithm, a first audio front-end module, a second front-end module, a first DSP interface, a second DSP interface, a first secure communication module, a second secure communication module, a first synchronous communication module, a second synchronous communication module, a first asynchronous communication module, a second asynchronous communication module, a voice communication module; and a data communication module;

means for loading said at least one of said plurality of software modules into a digital signal processor, said desired type of communication being one of a clear communication and a secure communication; and means for executing said at least one of said plurality of software modules to provide said desired communication type.

* * * * *